(12) United States Patent
Niepelt

(10) Patent No.: US 7,052,750 B2
(45) Date of Patent: May 30, 2006

(54) SEALABLE FILM FOR TEAR-OPEN PACKAGING

(75) Inventor: Ralf Niepelt, Gronau (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 0 days.

(21) Appl. No.: 10/633,934

(22) Filed: Aug. 4, 2003

(65) Prior Publication Data

US 2004/0067382 A1    Apr. 8, 2004

(30) Foreign Application Priority Data

Aug. 9, 2002    (DE) ................. 102 36 502

(51) Int. Cl.
*B32B 27/32*    (2006.01)
(52) U.S. Cl. ..................... 428/35.7; 428/516
(58) Field of Classification Search ......... 525/240; 428/516, 35.7
See application file for complete search history.

(56) References Cited

U.S. PATENT DOCUMENTS

| | | | | |
|---|---|---|---|---|
| 5,532,030 A * | 7/1996 | Hirose et al. | ............... | 428/35.7 |
| 5,561,208 A * | 10/1996 | Takahashi et al. | .......... | 526/281 |
| 5,846,620 A * | 12/1998 | Compton | ................... | 428/35.7 |
| 5,912,070 A * | 6/1999 | Miharu et al. | ............... | 428/214 |
| 6,030,255 A * | 2/2000 | Konishi et al. | ............. | 439/578 |
| 6,165,573 A * | 12/2000 | Hirose et al. | ............... | 428/36.6 |
| 6,310,160 B1 * | 10/2001 | Kodemura | ................... | 526/281 |
| 6,767,966 B1 * | 7/2004 | Berger et al. | ............... | 525/216 |
| 2001/0014384 A1 * | 8/2001 | Kishine | ....................... | 428/213 |
| 2003/0170479 A1 * | 9/2003 | Peiffer et al. | ............... | 428/515 |
| 2004/0067382 A1 * | 4/2004 | Niepelt | ...................... | 428/515 |
| 2004/0142195 A1 * | 7/2004 | Roberts et al. | ............. | 428/515 |

FOREIGN PATENT DOCUMENTS

| | | |
|---|---|---|
| EP | 0 120 562 A2 * | 10/1984 |
| EP | 1 213 138 | 6/2002 |
| EP | 1 300 238 A2 * | 4/2003 |
| JP | 08-165357 * | 6/1996 |

OTHER PUBLICATIONS

Verpackungs-Rundschau Sep. 1998, pp. 52 to 54.

* cited by examiner

*Primary Examiner*—D. Lawrence Tarazano
(74) *Attorney, Agent, or Firm*—Collard & Roe, P.C.

(57) ABSTRACT

A sealable film is used for the production of tear-open packages. The film, as a monofilm, in total, or as a multi-layer laminate film, produced by means of coextrusion, has at least in one layer a polymer mixture of a cycloolefin copolymer (COC) and polyolefin or an ethylene copolymer, whereby the COC portion in the polymer mixture is 10 to 80 wt.-%, the remainder polyolefin or ethylene copolymer. Packages produced from such films demonstrate balanced tear start and tear propagation properties in the crosswise and lengthwise direction of the film.

16 Claims, No Drawings

SEALABLE FILM FOR TEAR-OPEN PACKAGING

CROSS REFERENCE TO RELATED APPLICATIONS

Applicant claims priority under 35 U.S.C. §119 of German Application No. 102 36 502.4 filed Aug. 9, 2002.

BACKGROUND OF THE INVENTION

1. Field of the Invention

The present invention relates to the use of a sealable film for the production of tear-open packaging.

2. The Prior Art

Conventional blown films or flat films have very different mechanical properties in the lengthwise and the crosswise direction. While films made of polypropylene preferably tear in the machine running direction, tears in polystyrene films preferably propagate themselves crosswise to the machine running direction. The anisotropic mechanical properties are a disadvantage when these films are used as film packaging. When a film package is opened, there is the particular problem that the film package tears open in an uncontrolled manner.

Furthermore, cycloolefin copolymers are known as film materials (Verpackungs-Rundschau 9/18, pages 52 to 54). The raw material basis for cycloolefin copolymers is ethylene and dicyclopentadiene, from which the comonomer norbornene is obtained. Cycloolefin copolymers, abbreviated as COC, are produced from norbornene by solvent polymerization with ethylene, using metallocene catalysts. Cycloolefin copolymers are amorphous, relatively rigid and brittle, highly transparent plastics, the glass transition temperature of which can be modified by means of the installation ratio of ethylene and norbornene. Because of the brittle character of the polymers, the films possess a low tendency to tear and tend to break if they are bent severely. The mechanical properties of these materials can be modified by mixing them with polyolefins.

Deep-drawable laminate films, which have a layer of cycloolefin copolymer and at least one layer made from a polyolefin, are known from EP 1 213 138 A1. The connection between the COC layer and the polyolefin layer is produced by means of an adhesion agent, e.g. on the basis of a linear polyethylene.

SUMMARY OF THE INVENTION

The object of the invention is to provide a sealable film for the production of tear-open packaging, which does not tear open in an uncontrolled manner when the packaging is opened.

These and other objects are achieved in accordance with the invention by the use of a sealable film for the production of tear-open packages that demonstrate balanced tear start and tear propagation properties in the crosswise and lengthwise direction of the film. The film, which may be a monofilm or single layer film in total, or a multi-layer laminate film produced by means of coextrusion, has at least one layer of a polymer mixture of a cycloolefin copolymer (COC) and polyolefin or an ethylene copolymer. The COC portion in the polymer mixture is 20 to 80 wt.-%, the remainder polyolefin or ethylene copolymer.

Preferably, an ethylene/norbornene copolymer produced using metallocene catalysts is used as the cycloolefin copolymer. Mixing of the cycloolefin copolymer preferably takes place with a low-density polyethylene having a linear structure, particularly linear low-density polyethylene (LLDPE) or very low-density polyethylene (VLDPE). Furthermore, ethylene copolymers, e.g. ethylene/vinyl acetate copolymer (EVA), ethylene/butyl acrylate copolymer (EBA), ethylene/acrylic acid copolymer, (EAA) and the like are suitable for mixing. For tear-open packaging that is exposed to higher temperatures, polypropylene is preferably used for mixing with COC.

According to the invention, advantage is taken of the fact that a film which, as a monofilm, in total, or as a multi-layer laminate film, produced by means of coextrusion, contains at least in one layer a polymer mixture of COC and a polyolefin, demonstrates balanced mechanical properties in the lengthwise and crosswise direction of the film, and particularly possesses balanced tear start and tear propagation properties. A tear that occurs when the film is torn open propagates in a straight line, in each instance, both in the lengthwise direction of the film and the crosswise direction of the film. Packaging produced from this material, e.g. in the form of bags, can therefore be opened without having the packaging tear in an uncontrolled manner. Perforations or tear notches are not necessary. In addition, the film has good rigidity and therefore punchability and cuttability, and is easy to seal if the proportion of polyolefin is sufficient.

According to a preferred embodiment of the invention, sealable laminate films that have at least three layers are used to produce tear-open packaging. The laminate film can have a core layer made from a polyolefin and layers adjacent to the core layer on both sides made from polymer mixtures of cycloolefin copolymers and polyolefins. One outside layer may contain a polyolefin, as a sealing layer, and the other outside layer may be formed from a cycloolefin copolymer or a polymer mixture having a high cycloolefin copolymer proportion. For the intermediate layers, polymer mixtures of cycloolefin copolymers and polyolefins may be used that have a polyolefin content between the values in the outside layers. The polyolefin content changes, step by step, from a high value at the sealing layer to a low value at the opposite layer, the properties of which a re marked by the high COC proportion. According to a particularly preferred embodiment of the invention, the film possesses a three-layer structure, whereby the thickness of the core layer, which is a polyolefin or a polymer mixture with a high polyolefin content, is a multiple of the thickness of the two outside layers.

DETAILED DESCRIPTION OF PREFERRED EMBODIMENTS film that is used to produce tear-open packaging in accordance with the invention has a thickness of at least 15 μm and can be produced by means of a flat film extrusion process or an extrusion blowing process. The film can be further finished by means of lamination, imprinting, or coating, e.g. with aluminum coatings, before being processed further.

Exemplary Embodiments

The following exemplary embodiments relate to three-layer laminate films produced by means of coextrusion, having a symmetrical layer structure A-B-A or an asymmetrical layer structure A-B-C.

EXAMPLE 1

The laminate film has a total thickness of 70 μm and has a symmetrical layer structure A-B-A with Layer A: 10 μm
  80 wt.-% cycloolefin copolymer
  20 wt.-% polyethylene LLDPE C8

Layer B: 50 μm
  100 wt.-% polyethylene LLDPE C8

EXAMPLE 2

The laminate film has a total thickness of 50 μm and has a symmetrical layer structure A-B-A with Layer A: 7 μm
  80 wt.-% cycloolefin copolymer
  20 wt.-% polyethylene LLDPE C8

Layer B: 36 μm
  100 wt.-% polyethylene LLDPE C8

EXAMPLE 3

The laminate film has a total thickness of 50 μm and has an asymmetrical layer structure A-B-C with Layer A: 7 μm
  80 wt.-% cycloolefin copolymer
  20 wt.-% polyethylene LLDPE C8

Layer B: 36 μm
  20 wt.-% cycloolefin copolymer
  80 wt.-% polyethylene LLDPE C8

Layer C: 7 μm
  100 wt.-% polyethylene LLDPE Ci

The films according to the exemplary embodiments possess balanced mechanical properties in the lengthwise and crosswise direction, particularly balanced tear start and tear propagation properties. The following mechanical properties were measured in the machine direction, i.e. lengthwise direction MD, and the crosswise direction CD:

|  |  | Example 1 | Example 2 | Example 3 |
|---|---|---|---|---|
| Tear propagation properties according to Elmendorf ISO 6383-2 | MD mN | 1000–1400 | 400–600 | 250–450 |
|  | CD mN | 1000–1400 | 400–600 | 250–450 |
| Strengths DIN 53455 | MD N/inch | 40–50 | 25–35 | 23–33 |
|  | CD N/inch | 40–50 | 25–35 | 23–33 |
| Modulus of elasticity DIN 53455 | MD N/mm² | 500–600 | 500–600 | 450–550 |
|  | CD N/mm² | 450–550 | 500–600 | 450–550 |
| Stretching DIN 53455 | MD % | 400–600 | 300–500 | 150–350 |
|  | CD % | 400–600 | 300–500 | 150–350 |
| Yield stress DIN 53455 | MD N/inch | 30–40 | 20–30 | 15–25 |
|  | CD N/inch | 30–40 | 20–30 | 15–25 |
| Strengths at X % stretching DIN 53455 | 3% MD N/inch | 22–32 | 18–8 | 15–25 |
|  | 5% MD N/inch | 28–38 | 22–32 | 15–25 |
|  | 10% MD N/inch | 30–40 | 25–35 | 16–26 |
|  | 3% CD N/inch | 22–32 | 18–28 | 13–23 |
|  | 5% CD N/inch | 28–38 | 22–32 | 15–25 |
|  | 10% CD N/inch | 30–40 | 25–35 | 16–26 |

It was possible to produce packaging bags that were easy to open and demonstrated balanced tear start and tear propagation properties in the lengthwise and crosswise direction from all the films.

While only a few embodiments of the present invention have been shown and described, it is to be understood that many changes and modifications may be made thereunto without departing from the spirit and scope of the invention as defined in the appended claims.

What is claimed is:

1. A tear open package made of a multi-layer coextruded sealable film with balanced tear start and tear propagation properties of the tear open package in crosswise and lengthwise direction of the film wherein said film has three layers namely a core layer formed from a polyolefin, and on each side of said core layer an adjacent layer forming an outside layer which comprises a polymer mixture of
   a) 20 to 80 wt. % cycloolefin copolymer (COC) and
   b) remainder a member selected from the group consisting of a polyolef in and an ethylene copolymer.

2. The tear open package according to claim 1, wherein said core layer has a core layer thickness and each adjacent layer forming an outside layer has an outside layer thickness, said core thickness being a multiple of the outside layer thickness.

3. The tear open package according to claim 1, wherein the cycloolefin copolymer is an ethylene/norbornene copolymer produced using a metallocene catalyst.

4. The tear open package according to claim 1, wherein said member is a linear low-density polyethylene.

5. The tear open package according to claim 1, wherein said member is a polypropylene.

6. The tear open package according to claim 1, wherein said film has a thickness of least 15 μm.

7. The tear open package according to claim 1, wherein said film is produced by a flat film extrusion process or an extrusion blowing process.

8. The tear open package according to claim 1, wherein before further processing, said film is subjected to a finishing process selected from the group consisting of lamination, imprinting, and coating.

9. A tear open package made of a coextruded sealable film with balanced tear start and tear propagation properties of the tear open package in crosswise and lengthwise direction of the film wherein said film has three layers namely first and second outside layers and one core layer wherein said first outside layer is formed from a polyolefin, said second outside layer comprises a polymer mixture of
   a) 20 to 80 wt. % cycloolefin copolymer (CCC) and
   b) remainder, a member selected from the group consisting of a polyolef in and an ethylene copolymer
and said core layer is formed from a polymer mixture of cycloolefin copolymers and polyolefins having a polyolefin content less than said first outside layer and greater than said second outside layer.

10. The tear open package according to claim 9, wherein said core layer has a core layer thickness and each of said first and second layers has an outside layer thickness, said core layer thickness being a multiple of the outside layer thickness.

11. The tear open package according to claim 9, wherein the cycloolefin copolymer is an ethylene/norbornene copolymer produced using a metallocene catalyst.

12. The tear open package according to claim 9, wherein said member is a linear low-density polyethylene.

13. The tear open package according to claim 9, wherein said member is a polypropylene.

14. The tear open package according to claim 9, wherein said film has a thickness of least 15 μm.

15. The tear open package according to claim 9, wherein said film is produced by a flat film extrusion process or an extrusion blowing process.

16. The tear open package according to claim 9, wherein before further processing, said film is subjected to a finishing process selected from the group consisting of lamination, imprinting, and coating.

\* \* \* \* \*